United States Patent [19]

Medlin, Jr.

[11] Patent Number: 4,863,399

[45] Date of Patent: Sep. 5, 1989

[54] LOW VOLTAGE BRACKET

[76] Inventor: Lewis B. Medlin, Jr., 186 Wildhurst, NE., Roanoke, Va. 24012

[21] Appl. No.: 293,457

[22] Filed: Jan. 4, 1989

[51] Int. Cl.$^4$ ............................................. H01R 13/74
[52] U.S. Cl. .................................. 439/538; 439/560; 248/27.1
[58] Field of Search .............................. 439/536–539, 439/560, 561, 535; 248/27.1, DIG. 6; 174/58; 220/3.5, 3.6

[56] References Cited

U.S. PATENT DOCUMENTS

| | | | |
|---|---|---|---|
| 2,518,912 | 8/1950 | Lampe | 248/27.1 |
| 2,788,187 | 4/1957 | Cookson et al. | 248/27.1 |
| 4,561,615 | 12/1985 | Medlin, Jr. | 248/27.1 |
| 4,576,431 | 3/1986 | Thayer | 439/560 |
| 4,673,235 | 6/1987 | Conley | 439/536 |

FOREIGN PATENT DOCUMENTS 815658  10/1951  Fed. Rep. of Germany ..... 248/27.1

OTHER PUBLICATIONS

Caddy Fasteners Newsletter, No. 221, Aug. 1988, "MP1-S Plate Mounting Bracket for New Construction".

Primary Examiner—Gary F. Paumen
Attorney, Agent, or Firm—Olive & Olive

[57] ABSTRACT

An improved bracket for supporting a mounting plate having electrical connectors on a wall panel such as used in low voltage system for telephone, television, communication, speaker, alarm outlets and the like is adapted for either new work or old work. The bracket assumes one position for old work, is installed on the front side of and nests within the old work wall panel outlet opening and is secured by bendable legs forming part of the bracket. For new work, the bracket assumes another position and the bendable legs or other edge portions of the bracket are secured to a new construction member after which the bracket is nested into the back side of a new panel opening secured over the bracket.

17 Claims, 4 Drawing Sheets

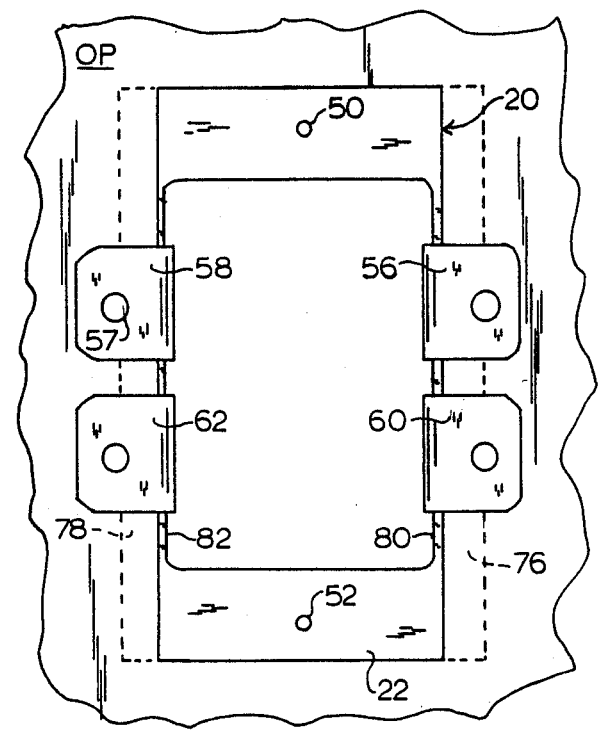
FIG. 8
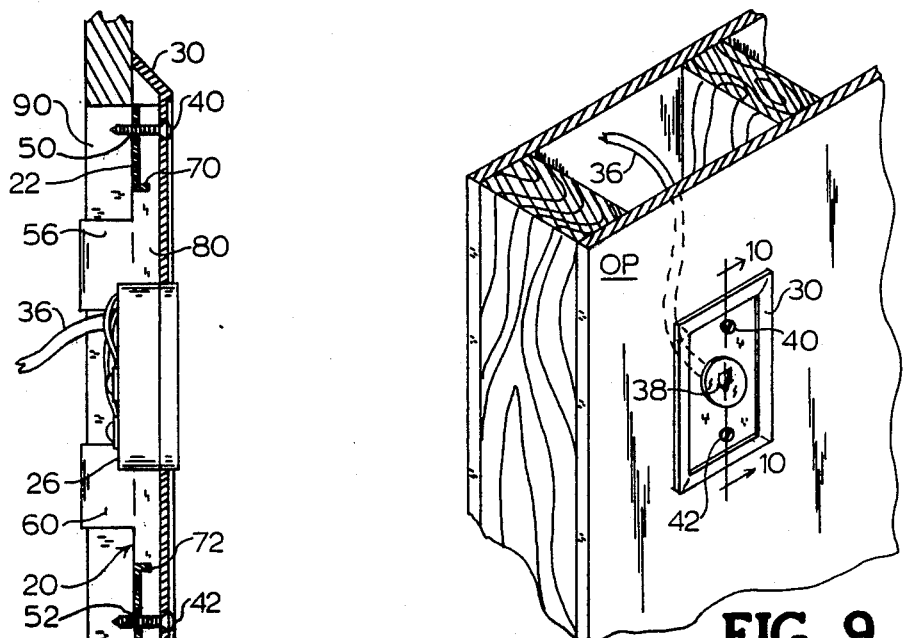
FIG. 10
FIG. 9

LOW VOLTAGE BRACKET

BACKGROUND OF THE INVENTION

1. Field of Invention

The present invention relates to a bracket which can be easily secured to a wall or other panel comprising old work as well as to a stud or the like comprising new work to permit a low voltage electrical receptacle plate such as a telephone outlet plate, television outlet plate, computer outlet plate or the like to be mounted on the wall, panel or stud in either new work or old work.

2. Background Art

It has become the practice in the trade when installing low voltage electric wiring for a telephone outlet, a television outlet, a computer outlet, or the like to mount the outlet plate for old work on one type of bracket which is typically secured to a dry wall panel and to mount the outlet plate for new work on another type of bracket which is typically secured to a metal stud or other construction member. U.S. Pat. Nos. 4,576,431 and 4,673,235 illustrate sheet metal formed brackets with bendable legs useful for mounting outlet plates on old work but which are not adapted for supporting outlet plates on new work. For new work, there is now available in the trade a type of sheet metal formed bracket sold as the Caddy Fasteners MP1-S bracket by Erico Products, Inc. of Cleveland, Ohio. All of the brackets thus far described are useful for either old work or new work but not for both types of work. Thus, there is a clear need in the trade for a bracket adapted to mount low voltage system outlet plates in either old work or new work.

The principal object of the present invention is thus to provide a bracket for mounting low voltage outlet plates and which, without any modification, can be used in one position for old work, in another position for new work or in a suitable work situation in the same position for either old or new work. Other objects will become apparent as the description proceeds.

SUMMARY OF INVENTION

The bracket of the invention in the illustrated embodiment is formed of a single piece of stamped sheet metal having a central rectangular portion with a rectangular opening, at opposite ends of the central portion a pair of plate mounting holes, a pair of spaced-apart bendable legs extending from each of opposite sides of the opening with each of the legs having a fastener receiving hole formed in the end thereof, narrow width rectangular edge portions with lengthwise spaced fastener holes and joined to side walls extending for the length of the bracket and depending from the sides of the opening, the edge portions residing on opposite sides of the central portion and in a plane offset from and parallel to the plane of the central portion. A pair of stiffening flanges are formed at the ends of the opening and extend between the side walls.

For new work, the bracket is positioned so as to allow the offsets to face outwardly. At least one and preferably two of the legs are bent within the bracket opening and secured to a metal stud or other construction member. Alternatively, fasteners can be placed through an edge portion to secure the bracket to a stud or the like. The dry wall is then formed with a suitable size opening and is thereafter nested over the bracket after which the mounting plate is secured to the bracket. For old work, the bracket position is reversed and the central portion of the bracket is used as a guide to mark an opening in the existing dry wall. The bracket is then placed with the offsets in the opening after which at least one and preferably two legs on each side of the bracket opening are bent into and around the side edges of the dry wall surrounding the dry wall opening to secure the bracket after which the mounting plate is installed on the bracket.

BRIEF DESCRIPTION OF DRAWINGS

FIG. 8 is an elevation view of the inside surface of the panel showing the legs bent around the inner side edges of the panel opening and securing the bracket to the panel.

FIG. 9 is a perspective view illustrating the mounting plate fully secured to the bracket ready for use.

FIG. 10 is a cross-sectional side view taken generally in the direction of line 10—10 of FIG. 9 showing the telephone outlet plate installed with the screws securing the mounting plate to the bracket.

DESCRIPTION OF THE PREFERRED EMBODIMENT

Figure 1:
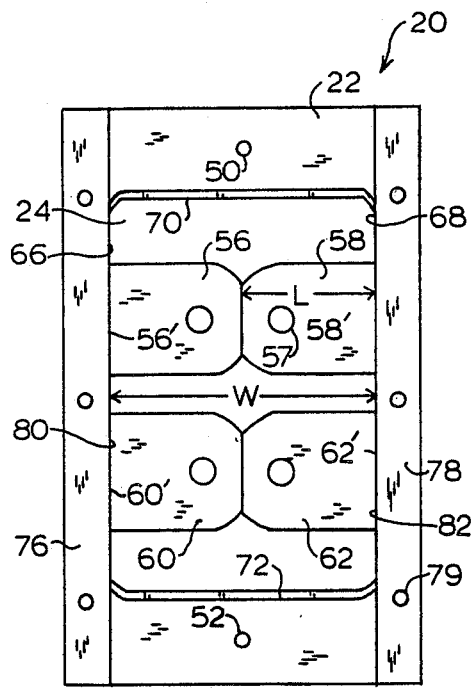
FIG. 1 is a front elevation view illustrating a single thin but rigid section of sheet metal formed to provide the bracket of the invention.
Figure 2:
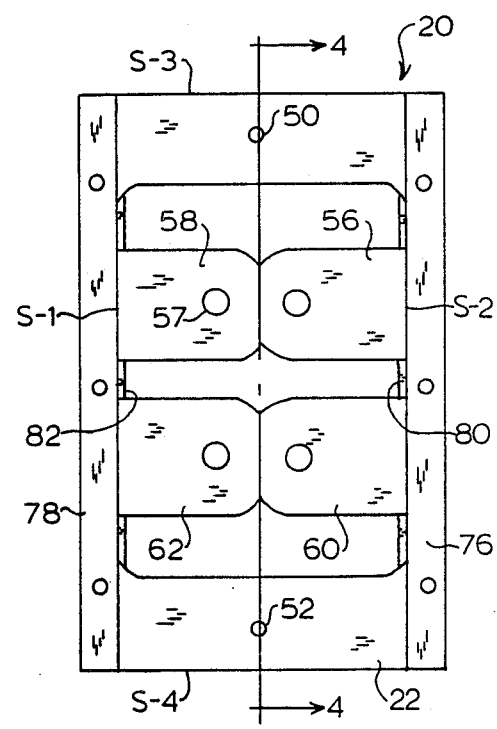
FIG. 2 is a rear elevation view of the bracket of FIG. 1.

Using the referred to prior art patents for background and referring to the drawings in detail, the improved bracket 20 (FIGS. 1 and 2) of the invention is formed of a single section of thin but rigid sheet metal and includes a flat central portion 22 having a relatively large central opening 24 of a size and shape suited to registering with and receiving low voltage electrical sockets 26 (FIG. 10) or the like appended to one or both the front and back of a mounting plate 30 to be supported by the bracket 20. Using a telephone mounting plate 30 as an example, plate 30 typically includes one or more electrical sockets such as sockets 26 on the back of the plate connected to telephone wiring 36 and on the front of the plate, a telephone jack receptacle 38 (FIG. 9). Plate 30 may also include screw hole stiffening ribs and stiffening posts on the back of the plate but which are not shown in the drawings. As later referred to, plate 30 is secured by means of a pair of screws 40, 42 received by screw holes 44, 46 (FIG. 7) and which thread into fastener holes 50, 52.

Continuing with the description of bracket 20 (FIG. 1), there is illustrated four bendable legs comprising a pair of opposed legs 56, 58 and another pair of opposed legs 60, 62 each of a length L substantially equal to half the width W of the opening 24. A fastener opening 57 is shown at the end of each leg. Legs 56, 58, 60 and 62 join central portion 22 at respective bending lines 56', 58', 60', and 62' which coincide with the respective side edges 66, 68 of opening 24. A pair of inwardly turned, right angled stiffening flanges 70, 72 (FIG. 1) are provided at opposite ends of the opening 24.

Figure 3:
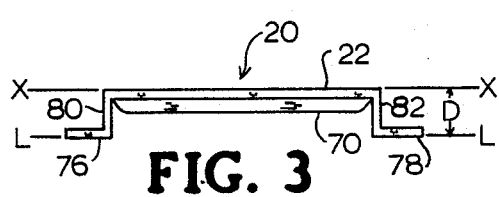
FIG. 3 is a bottom end view of the bracket of FIG. 1, the opposite top end view being a mirror image of the end view shown.
Figure 4:
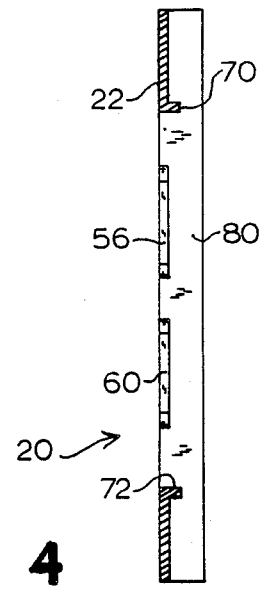
FIG. 4 is a cross-section view taken in the direction of line 4—4 of FIG. 2.

The relatively narrow width rectangular side portions 76, 78 (FIG. 3) extend outwardly from side walls 80, 82 and reside in a plane L—L offset by the depth D and parallel to the plane X—X of the central portion 22. This offset arrangement of the side portions 76, 78 enables the bracket 20 when in the position of FIG. 6 to effectively nest in the dry wall panel opening 90 when bracket 20 is used for old work as depicted in later explained FIGS. 5-10 and when in the position of FIG. 11 to have a new panel opening 110 nest over the bracket as in FIG. 12. Depth D is thus preferably equal to or less than the thickness T (FIG. 5) of the old dry wall panel OP or new dry wall panel NP and is also sized to accommodate bending of legs 56, 58, 60 and 62 over the inner side edges and inner face of the old work dry wall panel OP as seen in FIGS. 7, 8 and 10. Fastener holes 79 (FIG. 1) provide additional means for securing the side portions 76, 78 in either new or old work.

A typical installation, as a first example, assumes that a telephone outlet plate 30 (FIGS. 9 and 10) is to be installed on an existing or old dry wall panel OP. As an initial step, the boundaries of the side edges S-1, S-2 and end edges S-3, S-4 (FIG. 2) of central portion 22 are used as a template and a corresponding mark 92 (FIG. 5) is made defining the size opening 90 to be cut which is then cut out as best illustrated in FIG. 6. Bracket 20 is positioned to nest in opening 90 on the front of panel OP as in FIG. 6 and legs 56, 58, 60 and 62 are bent inwardly as shown in FIG. 6. Bracket 20 is then nested in the wall opening 90 as in FIG. 7 following which legs 56, 58, 60 and 62 are each bent over the inner side edges of the opening 90 in dry wall panel OP and outwardly so as to overlap and press against the inner surface of the dry wall panel OP as seen in FIGS. 7, 8 and 10. The telephone outlet plate 30 once assembled with its wiring 36 is then secured by means of screws 40, 42 into fastener holes 50, 52 as in FIG. 10. The now described installation for old work is complete and the description next turns to one example of how the invention bracket 20 may be used for new work.

Figure 5:
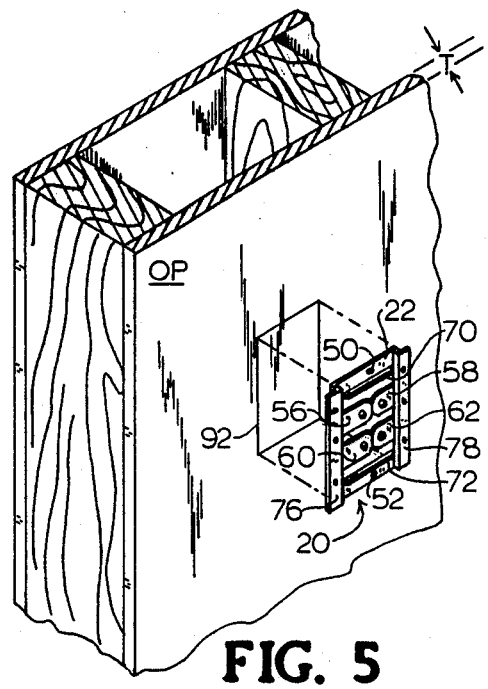
FIG. 5 is a perspective view illustrating the invention bracket opposite a hole marked on the panel of old work on which the bracket is to be mounted and positioned so that the bracket can be nested into the panel opening.
Figure 6:
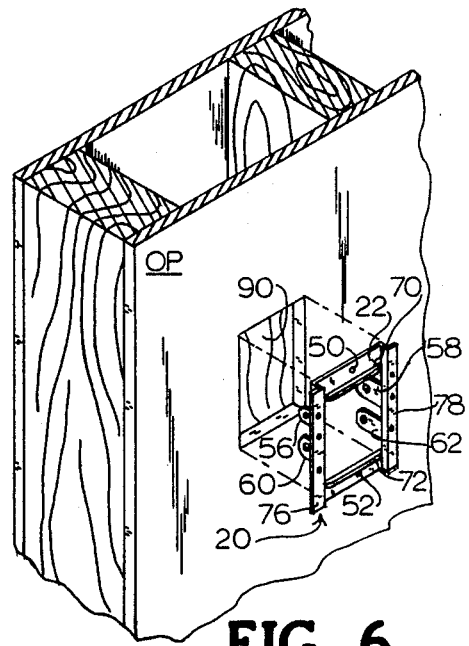
FIG. 6 is a perspective view similar to FIG. 5 after the panel opening has been cut and showing the legs bent inwardly and ready to be received by the opening in the old work panel.
Figure 7:
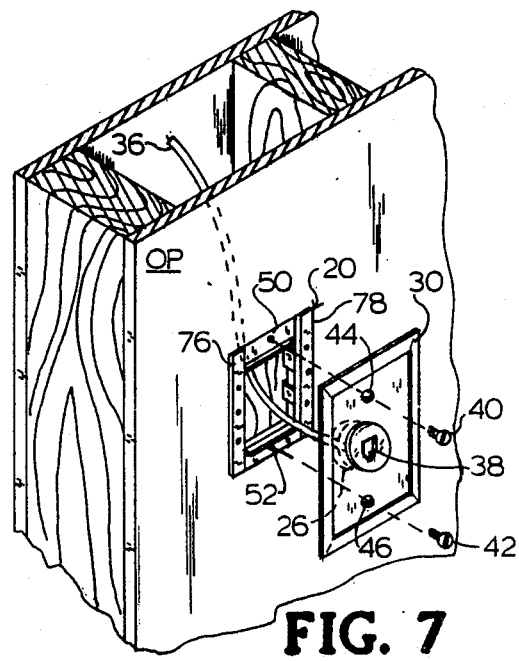
FIG. 7 is a perspective view illustrating the bracket installed and nested in the old work panel with the legs bent to secure the bracket to the side edges of the panel opening and with a low voltage telephone outlet plate by way of example having attached telephone wiring ready to be secured to the bracket.
Figure 11:
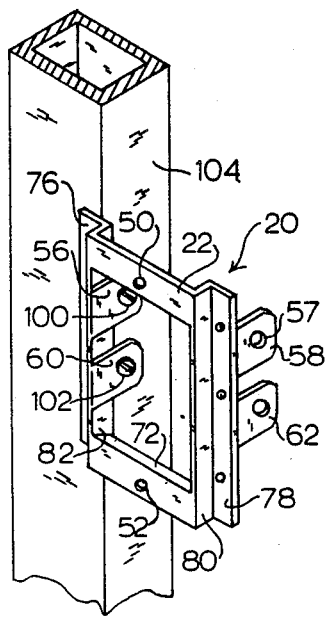
FIG. 11 is a perspective view of the invention bracket positioned for new work in an opposite position from that shown in FIGS. 5–7 and with a pair of the legs bent inwardly opposite to the direction shown in FIG. 6 and secured by fasteners to a metal stud.
Figure 12:
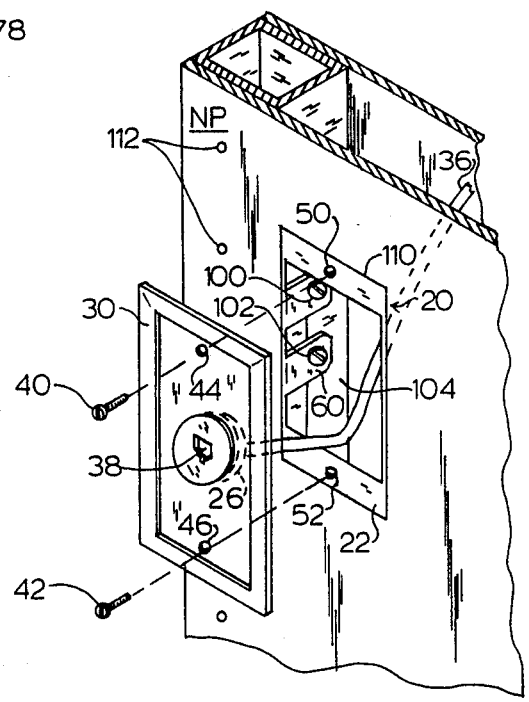
FIG. 12 is a perspective view illustrating the telephone outlet plate being used by way of example ready to be assembled to the bracket in its position on the new work and after the panel has been formed with an opening and nested over the bracket.

Making reference to FIGS. 11 and 12, it will be noted that bracket 20 is positioned such that the nesting portion formed by side portions 76, 78 and side walls 80, 82 faces outwardly in comparison to the bracket position shown in FIGS. 5, 6 and 7 for old work. That is, in this example for new work the bracket is positioned so that it can nest on the back of panel NP. The legs 56, 58, 60 and 62 are also bent inwardly, opposite to the direction of bend in FIGS. 5-8, and adjacent to side walls 80, 82 as in FIG. 11 after which bracket 20 is secured by fasteners 100, 102 passed through holes 57 secured to metal stud 104 as in FIG. 11. Alternatively, the bracket may be secured by welding a leg or edge portion, for example, or may be secured using the fastener holes 79 in one or both of the side portions. A suitable opening 110 is formed in the new dry wall panel NP (FIG. 12) after which the new panel NP is secured to the stud 104 by means of screws 112, rivets, nails, adhesive or the like depending on the requirements. The telephone outlet plate 30 is then secured as previously explained utilizing screws 40, 42.

In summary, the following job proven and practical advantages are achieved by the present improved low voltage outlet plate mounting bracket:

a. A single bracket adapts to both new work and old work.

b. The same bracket is adapted to nest within the sheet rock for either old work or new work thus facilitating obtaining a relatively smooth mounting surface.

c. Substantially no stress is placed on the mounting plate since the legs are not bent by tightening of the mounting plate screws but are bent to secure the bracket to the dry wall panel before the plate is mounted.

d. On the job inventory of brackets is reduced particularly when a building is being modified involving new work and old work.

e. The bracket can be secured in either old work or new work by bending the legs, by securing one or more legs to a stud or the like or by securing one or both of the edge portions to a stud or the like.

f. The bracket can be secured to any type of wall surface, i.e. sheet rock, plaster, paneling, etc. for either old work or new work.

Also to be recognized is that while not deemed to be the most desirable or practical method, the bracket 20 can be used in the same position for both old work and new work by cutting an opening in an installed new or old panel immediately adjacent a stud and installing the bracket positioned as in FIG. 6 but with one or more legs secured as in FIG. 11 rather than being bent as in FIG. 8. For old work, fastening holes 79 may be employed to fasten bracket 20 to a metal or wood stud. Various other ways of using the improved bracket 20 will suggest themselves to those skilled in the trade for both new work and old work.

Those skilled in the art will further recognize that bracket 20 could be easily modified to mount two outlet plates side by side or modified to mount a double or larger sized outlet plate. Means other than the illustrated screws could be employed for securing the outlet plate to the bracket. Also, while explained using a low voltage telephone outlet plate as an example and specific types of old work and new work construction, it will be readily appreciated that the invention bracket adapts to other well known types of old and new work and into a wide range of low voltage systems such as used for telephone systems, computers, intercoms, television cable connections, television antenna connections, fire alarms, burglar alarms, public address systems and heating and cooling controls. Thus, the foregoing description is to be interpreted within the meaning and range of equivalents of the claims hereafter following.

I claim:

1. A generally rectangular shaped bracket adapted for use in either old or new wall panel construction for mounting an assembly of a mounting plate having spaced apart screw openings and one or more electrical connector elements supported on one or both of the front and back sides of the plate, comprising:

(a) a single, unitary section of stiff, sheet material including:

(i) a flat central plate portion having a rectangular opening with defined ends and sides, said opening being sized to register with and loosely receive electrical connector elements appended to the back side of a mounting plate to be secured to the bracket;

(ii) a pair of fastener holes on the central plate portion located to mate with a corresponding pair of screw openings in a mounting plate;

(iii) a first pair of spaced apart legs joined to and bendable along a line coinciding with one side of said opening, each leg of said first pair being substantially equal in length to half the width of said opening;

(iv) a second pair of spaced apart legs joined to and bendable along a line coinciding with the other side of said opening, each leg of said second pair also being substantially equal in length to half the width of said opening;

(v) said legs prior to being bent residing in the plane of said central plate portion, for new work being bendable inwardly through said opening and for old work being bendable outwardly from said opening;

(vi) a pair of opposed side walls extending for the length of the bracket depending from the sides of and perpendicular to the plane of said opening;

(vii) a pair of flat rectangular edge portions extending outwardly from said walls and residing in a plane parallel to and offset from the plane of said central portion;

whereby when used for old work and after an opening substantially equal to the size of said central portion has been cut in the dry wall on which the bracket is to be mounted, said bracket central portion and side walls can be nested in the dry wall opening with said edge portions resting flush against the outer surface of said dry wall and said bracket can be secured by bending said legs around the interior side edges of said dry wall opening and against the back surface of said dry wall, and when used for new work, said bracket can be positioned with said side walls protruding outwardly and said bracket can be secured to a selected construction member such as a stud by securing a selected said leg or edge portion to said construction member and thereafter with a suitable size opening formed in a new dry wall panel, said panel can be nested over said bracket with said side walls residing within said new panel opening.

2. A bracket as claimed in claim 1 wherein said section of stiff sheet material includes fastener holes formed in the end of each said leg enabling any of said legs to be secured to a construction member such as a stud.

3. A bracket as claimed in claim 1 wherein said edge portions are of substantially narrow width compared to the width of said central portion.

4. A bracket as claimed in claim 1 wherein the depth of said offset is at least equal to the thickness of the dry wall panel on which the bracket is mounted.

5. A bracket as claimed in claim 1 wherein said edge portions each include a plurality of spaced apart fastener holes.

6. A bracket as claimed in claim 1 including a pair of stiffening flanges formed on each of said ends and extending perpendicular to the plane of said bracket opening and extending between said side walls.

7. A bracket as claimed in claim 1 wherein the legs of said first pair of legs are positioned opposite the legs of the said second pair of legs.

8. A generally rectangular shaped bracket adapted for use in either old or new wall panel construction for mounting an assembly of a mounting plate having spaced apart screw openings and one or more low voltage electrical connector elements supported on one or both of the front and back sides of the plate, comprising:

a. A single, unitary section of stiff sheet material including:

(i) a flat central plate portion having a rectangular opening with defined ends and sides, said opening being sized to register with and loosely receive electrical connector elements appended to the back side of a mounting plate to be secured to the bracket;

(ii) at least one fastener hole on the central plate portion located to mate with at least one corresponding screw opening in a mounting plate;

(iii) at least one first leg joined to and bendable along a line coinciding with one side of said opening, said leg being substantially equal in length to half the width of said opening;

(iv) at least one second leg joined to and bendable along a line coinciding with the other side of said opening, said second leg also being substantially equal in length to half the width of said opening;

(v) said legs prior to being bent residing in the plane of said central plate portion and for new work being bendable inwardly through said opening and for old work being bendable outwardly from said opening;

(vi) at least a pair of opposed side walls depending from the sides of and perpendicular to the plane of said opening; and (vii) at least a pair of flat rectangular edge portions extending outwardly from said walls and residing in a plane parallel to and offset from the plane of said central portion.

9. A bracket as claimed in claim 8 wherein said section of stiff material includes fastener holes formed in the end of each said leg enabling any of said legs to be secured to a construction member such as a stud.

10. A bracket as claimed in claim 8 wherein said edge portions each include a plurality of spaced apart fastener holes.

11. A bracket as claimed in claim 8 including a pair of stiffening flanges formed on each of said ends and extending perpendicular to the plane of said bracket opening and extending between said side walls.

12. A bracket as claimed in claim 8 comprising a plurality of both the first and second said legs and wherein the first said legs are positioned opposite the second said legs.

13. A generally rectangular shaped bracket adapted for use in either old or new wall panel construction for mounting an assembly of a mounting plate having spaced apart screw openings and one or more low voltage electrical connector elements supported on one or both of the front and back sides of the plate, comprising:

(a) A single unitary section of stiff sheet material including:

(i) at least one flat central plate portion having at least one rectangular opening with defined ends and sides, said opening being sized to register with and loosely receive at least one electrical connector element appended to the back side of at least one mounting plate to be secured to the bracket;

(ii) fastener means on the central plate portion located to mate with fastener means in a mounting plate;

(iii) at least one leg joined to and bendable along a line coinciding with at least one side of said opening;

(iv) said leg prior to being bent residing in the plane of said central plate portion and for new work being bendable inwardly through said opening and for old work being bendable outwardly from said opening;

(v) a selected number of side walls each depending from a said side and perpendicular to the plane of said opening;

(vi) a selected number of flat rectangular edge portions each extending outwardly from a said side wall and residing in a plane parallel to and offset from the plane of said central portion.

14. A bracket as claimed in claim 13 wherein said section of stiff sheet material includes fastener holes formed in the end of at least one said leg enabling said leg to be secured to a construction member such as a stud.

15. A bracket as claimed in claim 13 wherein each of said edge portions include a plurality of spaced apart fastener holes.

16. A bracket as claimed in claim 13 including a least one stiffening flange formed on at least one end and extending perpendicular to the plane of said bracket opening and extending between said side walls.

17. A bracket as claimed in claim 13 wherein said flat central portion includes at least one second leg joined to and bendable along a line coinciding with the other side of said opening, said legs each being substantially equal to half the width of said opening.

* * * * *